United States Patent [19]

Hashimoto

[11] Patent Number: 4,910,599
[45] Date of Patent: Mar. 20, 1990

[54] IMAGING APPARATUS HAVING ELECTRONIC ZOOMING WITH HIGH AND LOW SPEED READOUT

[75] Inventor: Seiji Hashimoto, Yokohama, Japan

[73] Assignee: Canon Kabushiki Kaisha, Tokyo, Japan

[21] Appl. No.: 388,728

[22] Filed: Aug. 1, 1989

Related U.S. Application Data

[63] Continuation of Ser. No. 165,935, Mar. 9, 1988, abandoned.

[30] Foreign Application Priority Data

| Mar. 20, 1987 | [JP] | Japan | 62-66507 |
| Mar. 20, 1987 | [JP] | Japan | 62-66508 |
| Mar. 20, 1987 | [JP] | Japan | 62-66509 |
| Mar. 31, 1987 | [JP] | Japan | 62-77952 |

[51] Int. Cl.$^4$ .............................................. H04N 3/14
[52] U.S. Cl. ............................ 358/213.26; 358/180
[58] Field of Search .................... 358/213.13, 213.19, 358/213.26, 213.22, 909, 180

[56] References Cited

U.S. PATENT DOCUMENTS

| 3,935,381 | 1/1976 | Petrocelli et al. | 358/180 |
| 4,002,824 | 1/1977 | Petrocelli et al. | 358/180 |
| 4,426,664 | 1/1984 | Nagumo et al. | 358/213.26 |
| 4,644,405 | 2/1987 | Roy et al. | 358/213.26 |
| 4,689,686 | 8/1987 | Hashimoto et al. | 358/213.26 |
| 4,703,365 | 10/1987 | Mumford | 358/213.26 |
| 4,734,772 | 3/1988 | Akiyama | 358/213.13 |
| 4,742,392 | 5/1988 | Hashimoto | 358/172 |
| 4,791,308 | 12/1988 | Nagashima | 250/578 |

FOREIGN PATENT DOCUMENTS 2588709 4/1987 France .

OTHER PUBLICATIONS

Patent Abstracts of Japan, vol. 7, No. 40 (E-159), 2/17/1983, p. 16 E 159.
JP-A-57 190 466 (Nippon Denki K.K.) Nov. 24, 1982.

*Primary Examiner*—Jin F. Ng
*Assistant Examiner*—Stephen Brinich
*Attorney, Agent, or Firm*—Fitzpatrick, Cella, Harper & Scinto

[57] ABSTRACT

An imaging apparatus for sequentially reading photoelectrically converted image information. The apparatus is capable of operating selectively either in a first mode in which a desired portion of the image information is read at a frequency different from the frequency for reading other portions of the image information, followed by a processing to form an effective image, and a second mode in which the desired portion of the image information is read at the same frequency as the frequency for reading other portions of the image information, followed by a processing to form an effective image. At least the clamping timing is changed in accordance with a change-over between the first mode and the second mode.

22 Claims, 11 Drawing Sheets

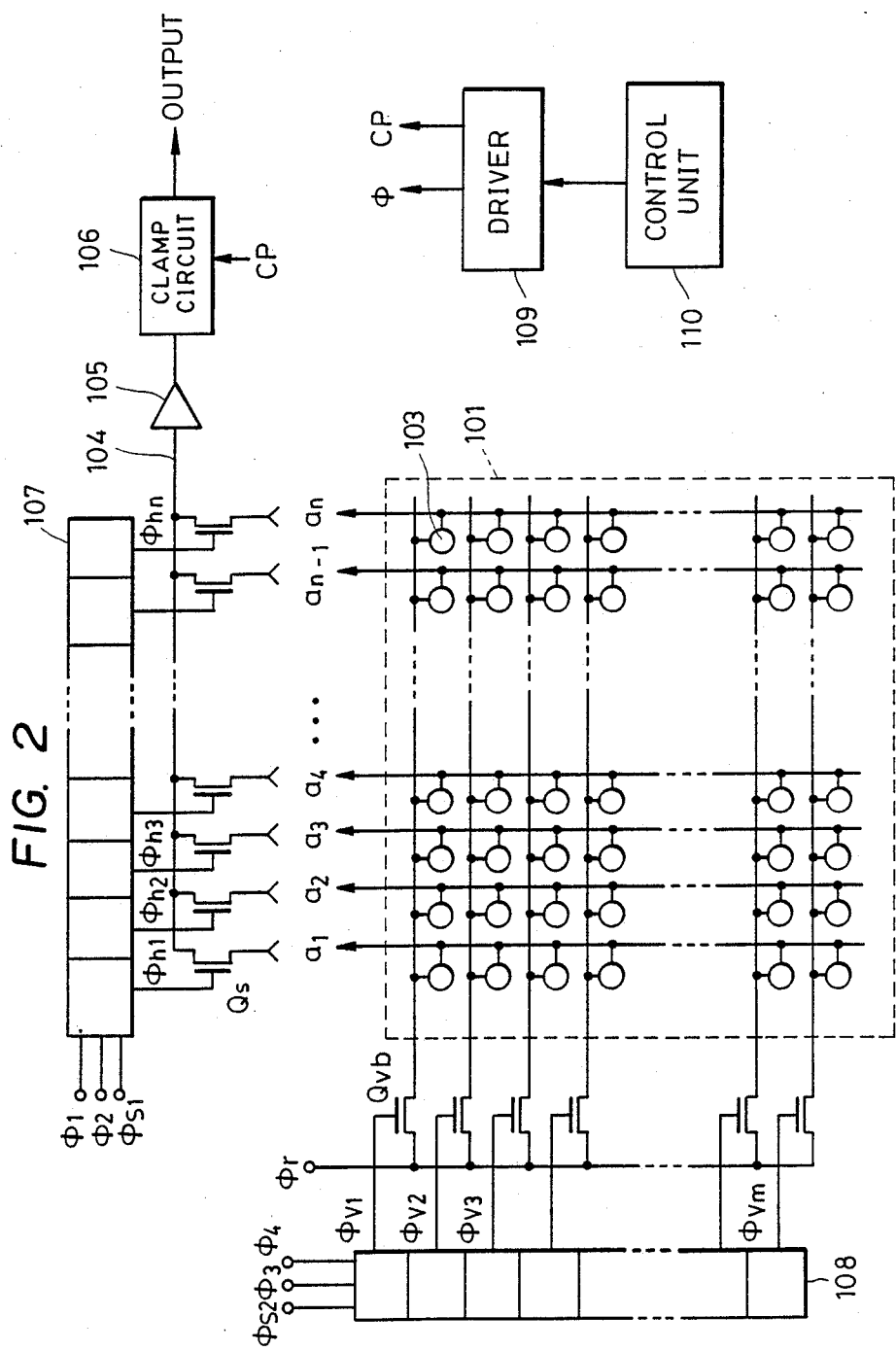

IMAGING APPARATUS HAVING ELECTRONIC ZOOMING WITH HIGH AND LOW SPEED READOUT

This application is a continuation of application Ser. No. 165,935 filed Mar. 9, 1988, now abandoned.

BACKGROUND OF THE INVENTION

1. Field of the Invention

The present invention relates to an imaging apparatus and, more particularly, to an imaging apparatus having a zooming function.

2. Description of the Related Art

Broadly, the methods for enlarging and contracting images can be sorted into two types: namely, a type in which an image is optically enlarged or contracted by means of a zoom lens system, and a method in which an image is electrically processed through, for example, an image memory device.

The method which relies upon an optical image processing, however, is disadvantageous in that it requires a zoom lens system which is large and heavy. The method which electrically processes an image also suffers a problem that a complicated image processing system has to be employed.

In general, signals read from an imaging device have a component corresponding to a photoelectrically converted signal as well as a clock leakage component which corresponds to reading and shifting clocks. Both components are superposed on each other to form the output signal from the imaging device. When the signal read out from the imaging device is directly supplied to a monitor for display, the clock leakage component produces noise in the form of vertical stripes which seriously impairs the quality of the displayed picture. The signal output from an imaging device also includes a moire component which results from the sampling of image information. The moire component is also a factor which impairs the quality of the displayed image.

SUMMARY OF THE INVENTION

An object of the present invention is to provide an imaging apparatus employing an imaging device which has image zooming and contracting functions.

Another object of the present invention is to provide an imaging apparatus which is capable of performing clamping of image signals without fail.

Still another object of the present invention is to provide an imaging apparatus which is capable of providing sufficient margins for clamping operation and elimination of unnecessary charges.

A further object of the present invention is to provide an imaging apparatus having an electrical zooming function, wherein generation of noises during electrical zooming is suppressed.

According to one aspect of the present invention, there is provided an imaging apparatus comprising reading means and processing means for sequentially reading photoelectrically converted image information, selectively in a first mode in which a desired portion of the image information is read at a frequency different from the frequency for reading other portions of the image information, followed by processing of the desired portion of the image formation to form an effective image, and in a second mode in which the desired portion of the image information is read at the same frequency as the frequency for reading other portions of the image information, followed by processing of the desired portion of the image formation to form an effective image, clamping means for setting a black reference signal for the processing means at a predetermined time within a blanking period and means for changing the predetermined time in accordance with a changeover between the first mode and the second mode.

Thus, the imaging apparatus in accordance with the first aspect of the present invention is capable of reading picture information obtained through a photoelectric conversion, selectively in the first and second mode of different reading frequencies. It is therefore possible to read the a portion of the image in a greater size by driving the part of the picture at a reduced speed in the effective period while driving the remaining part of the image at a high speed in the blanking period. By varying at least the clamping timing in accordance with the selected mode, it is possible to accurately clamp, for example, a black reference signal.

According to another aspect of the present invention, there is provided, in an imaging apparatus, means for sequentially transferring signals derived from an imaging device, scanning means arranged to simultaneously scan different portions of the imaging device other than a desired portion; and selective inhibiting means arranged to selectively inhibit the simultaneous scanning performed by the scanning means.

With this arrangement, when an image is read in zoomout reading mode by the scanning means capable of performing simultaneous scanning, it is possible to simultaneously eliminate different unnecessary parts of the image. Thus, unnecessary portions of the original image can be eliminated at a high speed, without requiring any high-speed driving of the scanning means.

The selective inhibiting means capable of partially inhibiting the simultaneous scanning makes it possible to read, for example, only OB (optical black) signals at a desired reading speed. This facilitates the clamping of the signal, thus ensuring a highly accurate setting of the black reference signal level.

According to a further aspect of the present invention, there is provided, in an imaging apparatus, means for shifting a part of an image signal selectively at a low speed and at a high speed, and processing means arranged to output a low-speed shifting signal for a predetermined portion of a one-line image signal, for every predetermined number of horizontal scans, and further arranged to process signals corresponding to other portions of the one-line image signal in the periods of horizontal scan along horizontal lines other than the horizontal scan line for which the low-speed shifting signal is output.

With this arrangement, it is possible, in the zoom-out reading mode of operation, to process signals corresponding to the unnecessary part of the image in another horizontal scanning period.

According to a still further aspect of the present invention, there is provided, in an imaging apparatus having means for changing the frequency of shifting of an image signal, filtering means arranged to filter a shifted image signal and means for changing the band cut-off frequency of the filtering means in accordance with a change in the shifting frequency.

In this apparatus, the filter effectively cuts off any leakage component of the shifting frequency and other noise components in, for example, the zoom-out reading mode of operation, thus ensuring a high quality of the zoomed-out image picture without suffering from vertical stripes.

The above and other objects, features and advantages of the present invention will become clear from the following description of the preferred embodiments taken in conjunction with the accompanying drawings.

BRIEF DESCRIPTION OF THE DRAWINGS

FIG. 2 is a schematic circuit diagram of an electrical circuit used in a first embodiment of the imaging apparatus of the present invention;

DESCRIPTION OF THE PREFERRED EMBODIMENTS

The invention will be fully understood from the following description of the preferred embodiments.

Figure 1:
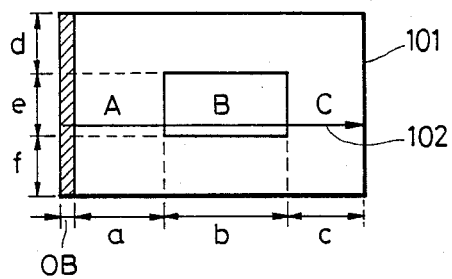
FIG. 1 is a diagram of an imaging device for illustrating the operation of an imaging apparatus of the invention in a zoom-out reading mode.

FIG. 1 illustrates the principle of the zoom-out reading operation of an imaging apparatus in accordance with the present invention, It is assumed that a portion B of the image formed on the imaging device 101 is to be displayed in a greater scale. This can be conducted by reading the portion B in an effective period of television operation, while processing other portion of the image in horizontal and vertical blanking periods.

For instance, in a horizontal scan 102, the signals corresponding to unnecessary portions such as the optical black (OB) and portions a and c are shifted at high speed during horizontal blanking, while the signals corresponding to the portion b to be zoomed out and displayed are shifted at a low speed in the effective period of the television operation. Similarly, in the vertical scanning, the signals corresponding to the portion e to be zoomed out and displayed are shifted at a low speed in the effective period of the television operation, while the signals corresponding to the unnecessary portions d and f are shifted at a high speed in the vertical blanking period.

The horizontal shifting frequency for shifting the portion B varies according to the zooming ratio. For instance, when the image is to be read in a double size, the signals corresponding to the portion B are shifted at a frequency of $f_s/2$, where $f_s$ represents the horizontal shifting frequency, while signals corresponding to other portions are shifted at a high speed of $3f_s$, taking into account the reading of the optical black (OB). When shifting of other data is necessary in the horizontal blanking period, a higher shifting speed may be adopted.

FIG. 2 is a schematic circuit diagram of an embodiment of the imaging apparatus of the present invention.

The imaging apparatus has an imaging device 101 composed of photoelectric conversion cells 103 which are arranged in the form of a matrix having m lines and n columns. The outputs $a_l$ to $a_n$ of the vertical lines of the imaging device 101 are successively delivered to the output line 104 through transistors $Q_s$ and are serially output to a clamp circuit 106 through an amplifier 105. Some bits of the output in the region of $a_l$ bear an optical black signal (OB). Therefore, the clamp circuit 106 clamps these bits in synchronization with a clamp pulse CP, thereby setting the reference black level.

The gate electrodes of the respective transistors $Q_s$ receive horizontal scanning pulses $\phi h_l$ to $\phi h_n$ which are delivered by a horizontal shift register 107. The shift register 107 successively outputs horizontal scanning pulses in synchronization with pulses $\phi_1$ and $\phi_2$ upon receipt of a start pulse $\phi s_1$. It is therefore possible to vary the horizontal shifting frequency by controlling the frequency of the pulses $\phi_1$ and $\phi_2$.

Driving pulses $\phi_r$ are delivered to the horizontal lines of the imaging device 101 through transistors $Q_{vb}$. Vertical driving pulses $\phi_{vl}$ to $\phi_{vm}$ are delivered to the gate electrodes of the transistors $Q_{vb}$ from a vertical shift register 108. Thus, only the cells 103 belonging to the horizontal line receiving the vertical scanning pulse from the vertical shift register 108 are driven, and the signals $a_l$ to $a_n$ of this line are successively read.

The vertical shift register 108 is adapted for successively outputting vertical scanning pulses in synchronization with the pulses $\phi_3$ and $\phi_4$ upon receipt of a start pulse $\phi s_2$. It is therefore possible to vary the vertical scanning speed by controlling the frequency of the pulses $\phi_3$ and $\phi_4$.

The pulses $\phi_1$ to $\phi_4$, $\phi s_1$, $\phi s_l$ and $\phi r$ for driving the shift register, photoelectric conversion cells and the clamp circuit, as well as the clamp pulse CP, are supplied from a driver 109 at a timing controlled by a control unit 110.

Figure 3:
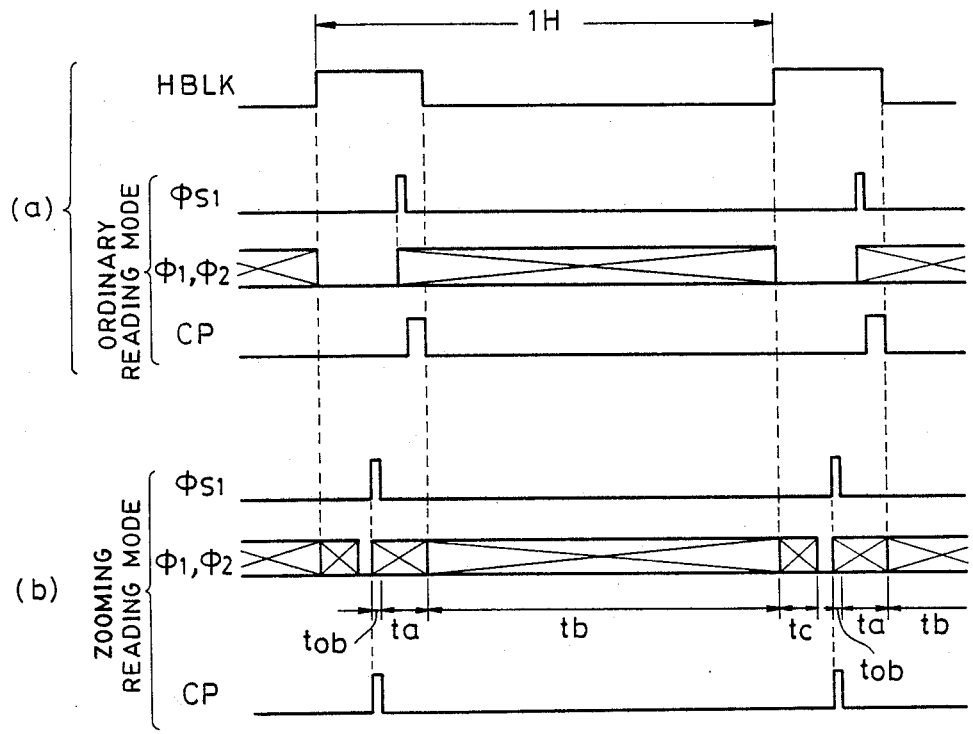
FIG. 3 is a timing chart illustrating an example of operation of the circuit diagram shown in FIG. 2.

The operation of this circuit will be explained with reference to FIG. 3 which is a timing chart showing the timing of various signals in this circuit. The upper portion (a) of FIG. 3 shows the timing of signals obtained during operation of the apparatus in ordinary reading mode. In this mode, a start pulse $\phi_{s1}$ is input during the horizontal blanking period (HBLK), so that the shift register 107 is driven in accordance with the pulses $\phi_1$ and $\phi_2$ at a frequency $f_s$, whereby a series of signals $a_l$ to $a_n$ corresponding to one horizontal scanning line are shifted in succession. The clamp circuit 106 operates in synchronization with the clamp pulse CP so as to set the reference black level in accordance with the OB signal carried by several bits of the successive signals. This is done so that subsequent signals from the same horizontal scanning line will be output with the black level fixed accurately.

This scanning operation is performed for the successive horizontal lines as they are selected by the vertical shift register 108, thus reading signals from all the pixels of the matrix of the cells constituting the imaging device 101.

The scanning of the horizontal lines corresponding to the unnecessary portion d of the image (FIG. 1) is conducted at a high speed in a vertical blanking period. Then, the scanning of the horizontal lines corresponding to the portion e of the image to be zoomed out is conducted at a reduced speed within the vertical effective period, while the horizontal scan is performed in a manner which will be described later. After completion of the low-speed vertical scanning of the horizontal lines corresponding to the portion e of the image, scanning of the horizontal lines corresponding to the unnecessary portion f is conducted at a high speed in the next vertical blanking period.

The horizontal scan, i.e., scanning along each horizontal line, in the portion e (FIG. 1) to be zoomed out is conducted as follows. The start pulse $\phi_{s1}$ is input in a horizontal blanking period so that the shift register 107 is driven at a frequency of, for example, $3f_s$. Within the period of scanning over one horizontal line, the optical black (OB) signal is output in a period $t_{ob}$ which is received by the clamp circuit 106 in accordance with the clamp pulse CP whereby the reference black level is set. In the zoom-out reading mode, the timing of the clamp pulse CP is set to be earlier and the pulse width thereof is set to be slightly smaller than the timing and width of the clamp pulse CP in the ordinary reading mode. The signals corresponding to the unnecessary portion of each horizontal line are read and shifted at high speed within a period ta so as to be eliminated.

Subsequently, the signals corresponding to the portion b to be zoomed out are shifted in synchronization with the effective period tb at a reduced frequency $f_s/2$.

Then, the signals corresponding to the remaining unnecessary portion c are transferred at a high frequency of $3f_s$ in the next horizontal blanking period.

Thus, the imaging apparatus in accordance with the present invention is capable of reading a desired portion of an image in a zoomed-out state, by suitably varying the frequency of the reading pulse, in such a manner that the signals corresponding to the desired portion of the image are read in the effective period of the scan at a reduced frequency of the reading pulses, while the signals corresponding to the unnecessary portions are read in accordance with reading pulses of high frequency within blanking periods. In addition, it is possible to accurately clamp, for example, the black reference level by varying at least the clamp timing in accordance with the selected mode of operation.

The above-described construction of the first embodiment is only illustrative and may be modified in various ways. For instance, the described first embodiment may be modified such that the vertical scanning unit has an interlace circuit or such that color decomposition mosaic filter is provided on the imaging device such that a color picture signals are obtained from a plurality of lines.

In recent years, a system called "multi-horizontal-register system", which employs a plurality of shift registers, has been used in order to comply with a demand for increases in the number of pixels of solid state imaging device. This system is effective in reducing the horizontal shifting frequency per register. In this system, however, it is necessary to shift signals to the respective registers in the horizontal blanking period; and consequently the length of time in the horizontal blanking period available for other purposes is shortened undesirably. Therefore, in the zoom-out reading mode of operation of the described embodiment, the signals corresponding to the unnecessary portions are preferably eliminated at a speed which is as high as possible.

In the first embodiment as described, the high speed of elimination of unnecessary signals for providing a margin in each horizontal blanking period is possible only through an increase in the shifting frequency, because the signals corresponding to the unnecessary portions a and c are shifted and eliminated in a time-series manner. In consequence, the period $t_{ob}$ for shifting the optical black signal OB is shortened, causing a risk for the clamp circuit to clamp, for example, the reference black level wrongly.

Figure 4:
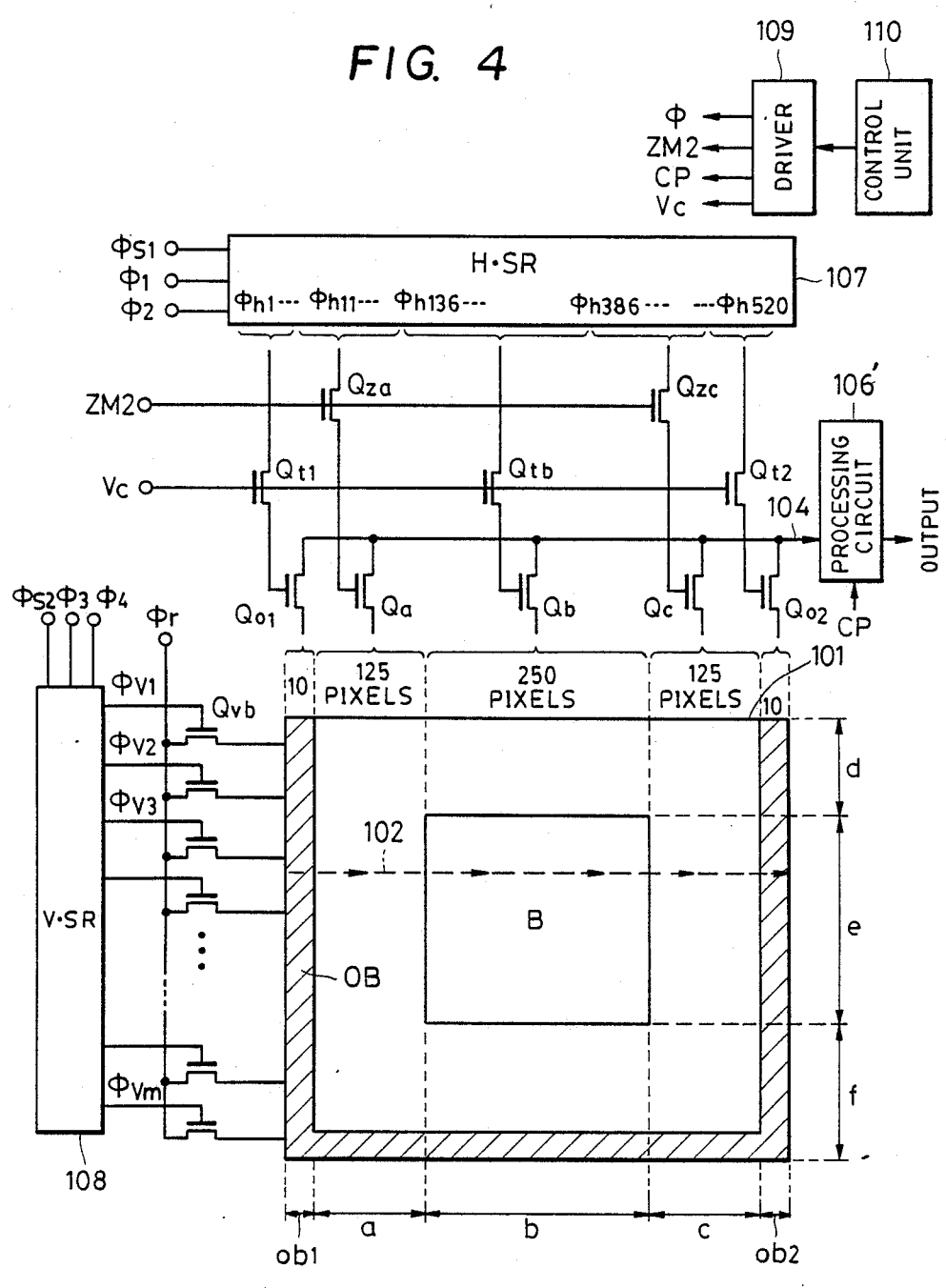
FIG. 4 is a schematic illustration of a second embodiment of an imaging apparatus in accordance with the present invention.

This problem can be overcome by a second embodiment of the imaging device of the present invention which is schematically shown in FIG. 4.

Referring to this figure, the imaging device 101 is composed of a matrix of pixels arranged in m lines and n columns. The number n, which corresponds to the number of pixels in each horizontal line, is assumed to be n=520. It is also assumed that 10 pixels counted from the starting ends of the series of pixels bear signals corresponding to optical black (OB) for the purpose of clamping and setting of the reference black level.

In this embodiment, the imaging device 101 carries an image a central portion B of which is to be zoomed out at a magnification 2. Signals carried by pixels of each horizontal line are read successively. There are optical black (OB) reading portions $ob_1$ and $ob_2$ each including 10 pixels, on the leading and trailing ends of the series of signals from the pixels of each horizontal line. The signals from each optical black reading portion are read through 10 transistors, collectively represented at $Q_{o1}$ and $Q_{o2}$, respectively. The portions a and c of the image to be eliminated, on both sides of the portion b to be zoomed out, include 125 pixels, respectively. Signals from the pixels of these portions a and c are read through 125 transistors, collectively represented at $Q_a$ and $Q_c$, respectively. The portion b of the image to be zoomed out covers 250 pixels the signals from which are read through 250 transistors, collectively represented at $Q_b$. The signals thus read through the respective transistors $Q_{o1}$, $Q_a$, $Q_b$, $Q_c$ and $Q_{o2}$ are sequentially delivered to the output line 104 and are output through a processing circuit 106'. It will be understood that, in FIG. 4, only one transistor is shown for each of the transistors $Q_{o1}$, $Q_a$, $Q_b$, $Q_c$ $Q_{o2}$ as a representative, and in the actual imaging device 101, a plurality of transistors corresponding to the numbers of pixels along the horizontal line are included in each of the transistors $Q_{o1}$, $Q_a$, $Q_b$, $Q_c$ and $Q_{o2}$ shown in FIG. 4.

The processing circuit 106' is constituted by an amplifier and a clamp circuit. The clamp circuit operates in accordance with the clamp pulse CP so as to clamp the level of the signal from the optical black (OB) portion, thereby accurately fixing the black level of the signals obtained from the respective pixels.

The outputs $\phi h_1$ to $\phi h_{10}$ from the beginning 10 bits of the horizontal shift registers 107 are sequentially input to the gate electrodes of ten transistors $Q_{o1}$, through corresponding 10 transistors $Q_{t1}$.

Similarly, outputs from the subsequent 125 bits of the shift register 107 are sequentially input to the gate electrodes of 125 transistors $Q_a$, through corresponding 125 transistors $Q_{za}$.

Similarly, outputs from the subsequent 250 bits of the shift register 107 are sequentially input to the gate electrodes of 250 transistors $Q_b$, through corresponding 250 transistors $Q_{tb}$.

Similarly, outputs from the subsequent 125 bits of the shift register 107 are sequentially input to the gate electrodes of 250 transistors $Q_b$, through corresponding 250 transistors $Q_{zc}$.

Finally, the outputs from the last 10 bits of the horizontal shift registers 107 are sequentially input to the gate electrodes of ten transistors $Q_{o2}$, through corresponding 10 transistors $Q_{t2}$.

The gate electrodes of the transistors $Q_{t1}$, $Q_{tb}$ and $Q_{t2}$ commonly receive a voltage $V_c$. These transistors $Q_{t1}$, $Q_{tb}$ and $Q_{t2}$ conduct when they are in receipt of the voltage $V_c$.

The gate electrodes of the transistors $Q_{za}$ and $Q_{zc}$ receive a zooming control signal $ZM_2$ and are turned off only when the portion B of the image is to be read in the zoomout mode. As will be explained later, the transistors $Q_{za}$ and $\overline{Q_{zc}}$ constitute selective inhibition means.

The horizontal shift register 107 operates in synchronization With the start pulse $\phi_{s1}$ in synchronization with the pulses $\phi_1$ and $\phi_2$, and sequentially outputs the scanning pulses $\phi_{hl}$ to $\phi_{hn}$. It is thus possible to vary the horizontal shifting frequency by suitably controlling the frequency of the pulses $\phi_1$ and $\phi_2$.

Meanwhile, the horizontal lines of the imaging device 101 receive the driving pulse $\phi_r$ through the transistors $Q_{vb}$. The transistors $Q_{vb}$ sequentially receive at their gate electrodes the vertical scanning pulses $\phi_{vl}$ to $\phi_{vm}$ from the vertical shift register 108. Thus, the driving of the pixels is conducted only in the horizontal line which is in receipt of the vertical scanning pulse from the vertical shift register 108, and the signals from these pixels of this horizontal line are read in sequence.

The vertical shift register 108 is adapted to sequentially output vertical scanning pulses in synchronization with the pulses $\phi_3$ and $\phi_4$, upon receipt of the start pulse $\phi_{s2}$. It is therefore possible to vary the speed of the vertical scanning by varying the frequency of the pulses $\phi_3$ and $\phi_4$.

The pulses mentioned above are delivered by a driver 109 which is controlled by a control unit 110.

The operation of the embodiment of FIG. 4 will be explained with reference to FIG. 5 which is a timing chart showing the timing of various signals obtained during the operation of this embodiment.

The operation in ordinary reading mode will be first explained with reference to the upper portion of FIG. 5.

In this operation mode, the zooming control signal ZM2 is set high so that the transistors $Q_{za}$ and $Q_{zc}$ are turned on. The start pulse $\phi_{s1}$ is then input within a horizontal blanking period (HBLK) and the shift register 107 is driven by the pulses $\phi_1$ and $\phi_2$ at a frequency $f_s$. In consequence, all the signals from all the pixels of each horizontal line are shifted in sequence. The processing circuit 106' then sets the reference black level in accordance with the optical black signal carried by the beginning 10 pixels within a period $t_{ob1}$ which corresponds to the duration of the clamp pulse CP, thereby accurately fixing the black level for the signals from succeeding pixels.

This horizontal scanning operation is conducted sequentially for all horizontal lines selected by the vertical shift register 108, whereby the signals from all the pixels are read.

The operation in the zoom-out mode will be explained with reference to the lower portion of FIG. 5.

In this mode, the zooming control signal ZM2 is set low, so that the transistors $Q_{za}$ and $Q_{zc}$ are turned off. During the vertical scanning, a high speed scanning is conducted to scan the horizontal lines in the unnecessary region d. Then, the horizontal lines in the region to be zoomed out are scanned, while scanning along these horizontal lines is conducted in a manner explained later, at a reduced speed in the effective vertical period. After the completion of the low-speed driving throughout the region e to be zoomed out, scanning of the horizontal lines in the unnecessary portion f is conducted at a high speed in the next vertical blacking period.

The horizontal scanning along a horizontal line including the portion e to be zoomed out, e.g., a horizontal line 102, is conducted in a manner which will be explained hereinunder. After the horizontal scan along the preceding horizontal line is finished, the horizontal shift register 107 is stopped in such a state as to enable the output from the leading end ($\phi h_{386}$) of the unnecessary portion c.

With the system in this state, the start pulse $\phi_{s1}$ is input in the horizontal blanking period and the shift register 107 is driven by an amount corresponding to 125 pixels, at a driving frequency $2f_s$, in a period $t_{ac}$. Thus, the portion or bits of the horizontal shift register corresponding to the whole of the unnecessary portion c, the optical black portion ob$_1$ and most of the unnecessary portion a are simultaneously driven. Since the transistors $Q_{za}$ and $Q_{zc}$ constituting inhibiting means have been turned off, the signals corresponding to the unnecessary portions a and c are not read out. The signals from the optical black portion ob$_1$ are delivered to the output line 104 but are not used for clamping. Subsequently, the shift register 107 is driven by amount corresponding to 10 pixels, with the frequency of the pulses $\phi_1$ and $\phi_2$ set at $f_s$. Since the transistor $Q_{za}$ and $Q_{zc}$ are off, while the transistor $Q_{t2}$ is on, the signals from 10 pixels corresponding to the optical black portion ob$_2$ are sequentially output without being superposed to other signals, whereby the black reference level is clamped by the processing circuit 106'. In this embodiment, the clamping of the reference black level is obtained by making use of the signals from the period ob$_2$ rather than the period ob$_1$, and the shifting of the the signals to be clamped takes place at a frequency $f_s$. Thus, the same clamp pulse CP as that used in the ordinary reading mode can be used in the zoom-out reading mode, whereby the clamping can be conducted at a correct timing.

Thus, the elimination of the signals corresponding to the unnecessary portions a, c is conducted in the period $t_a$, while the reading of the signals from the optical black portion $ob_2$ for clamping the reference black level is accomplished in the period $t_{ob2}$, whereby the elimination of unnecessary signals and the reading of the reference signal to be clamped are conducted in a comparatively short time.

After the completion of the described operation, the control unit 110 gives an instruction for causing the driver 109 to reduce the frequency of the pulses $\phi_1$ and $\phi_2$, such that the horizontal shift register 105 is driven at a frequency $f_s/2$. Thus, the scanning pulses to $\phi h_{385}$, corresponding to 250 pixels of the image portion b to be zoomed out, are sequentially output at a frequency which coincides with the effective horizontal period, at a frequency which is $\frac{1}{2}$ that in the ordinary reading mode. These signals are processed through the processing circuit 106' in which the reference black level has already been clamped, so that a series of pixel signals with a constant black level are obtained.

When the period $t_b$ is over, the delivery of the pulses $\phi_1$ and $\phi_2$ is ceased so that the horizontal shift register 107 is stopped in such a state as to enable the output of the scanning pulse $\phi h_{386}$ corresponding to the starting end of the unnecessary portion c.

By controlling the shift register and the selective inhibition means in the manner described, it is possible to simultaneously eliminate all the unnecessary portions, while enabling the necessary optical black portion $o_{b2}$ to be read accurately.

Figure 6:
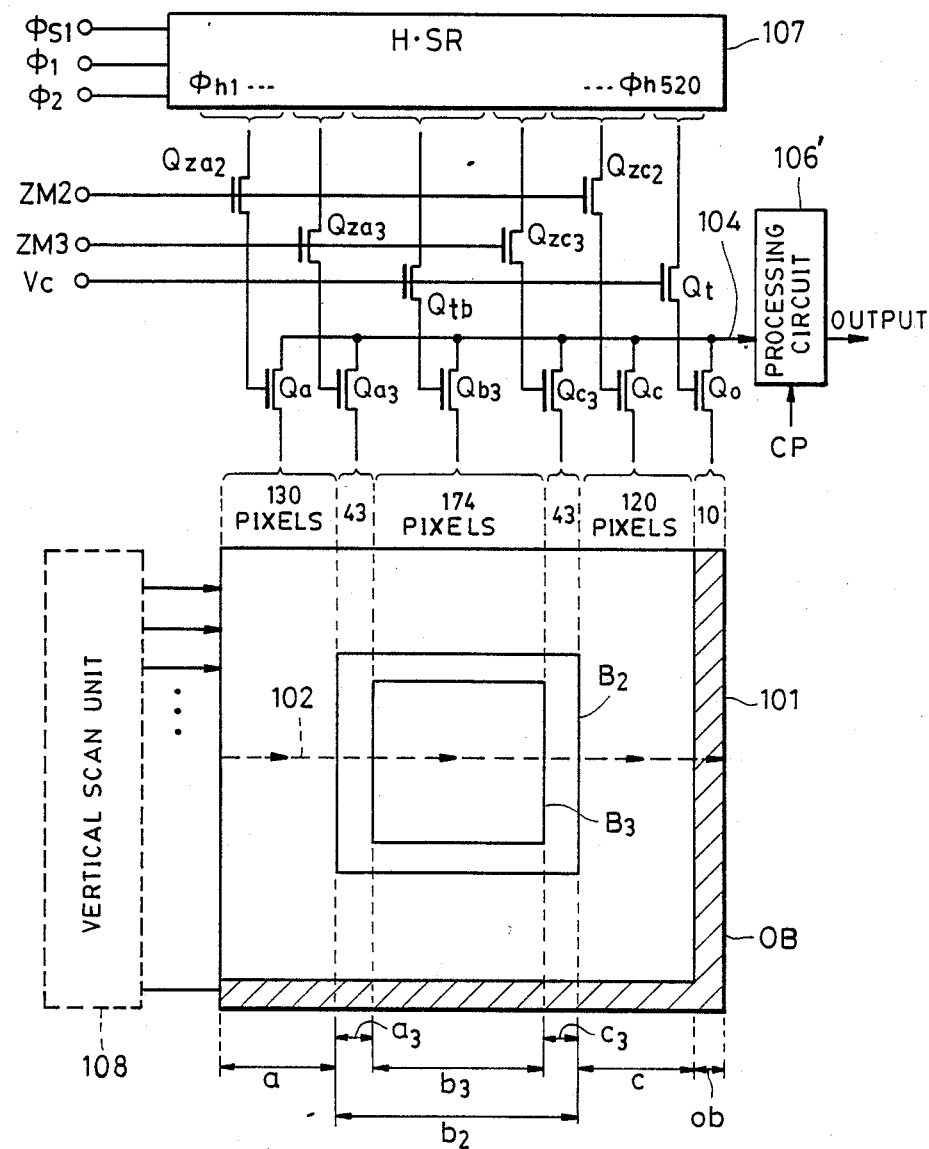
FIG. 6 is a a schematic illustration of a third embodiment of an imaging apparatus in accordance with the present invention.

FIG. 6 schematically shows a third embodiment of the present invention.

In this embodiment, an optical black portion OB is formed on one end of the imaging device 101. It is also assumed that the image has a portion $B_2$ which is to be zoomed out with magnification 2 and a portion $B_3$ which is to be zoomed out with magnification 3.

As in the case of the first embodiment, the pixel signals are sequentially read in a line-by-line manner. More specifically, the signals from the leading 130 pixels are read through transistors collectively represented at $Q_a$, followed by reading of signals from subsequent 43 pixels through transistors collectively represented at $Q_{a3}$. Then, signals are read from the subsequent 174 pixels through transistors collectively represented at $Q_{b3}$, followed by reading of signals from the subsequent 43 pixels through transistors collectively represented at $Q_{c3}$. Then, signals are read from the subsequent 120 pixels through transistors collectively represented at $Q_c$. Finally, signals from the last portion, i.e., 10 pixels of the optical black portion, are read through transistors collectively represented at $Q_0$. The series of signals thus obtained through the transistors $Q_a$, $Q_{a3}$, $Q_{b3}$, $Q_{c3}$, $Q_c$ and $Q_o$ are serially delivered through the output line 104 to the processing circuit 106'. As in the case of FIG. 2, only one transistor is illustrated for each of the transistors $Q_a$, $Q_{a3}$, $Q_{b3}$, $Q_{c3}$, $Q_c$ and $Q_o$. The gate electrodes of the transistors $Q_a$, $Q_{a3}$, $Q_{b3}$, $Q_{c3}$, $Q_c$ and $Q_o$ receive scanning pulses $\phi h_1$ to $\phi h_2$ through 130 transistors $Q_{za2}$, 43 transistors $Q_{za3}$, 174 transistors $Q_{tb}$, 43 transistors $Q_{zc3}$, 120 transistors $Q_{za2}$ and 10 transistors $Q_t$, respectively.

The transistors $Q_{za2}$ and $Q_{zc2}$ receive at their gate electrodes a doubling zooming control signal ZM2, while the gate electrodes of the transistors $Q_{za3}$ and $Q_{zc3}$ receive tripling zooming control signal ZM3. The construction of the processing circuit 106', the shift register 107 and the vertical scanning unit 108 are not described because they are identical to those in the second embodiment described before.

The operation of the third embodiment will be described hereinunder with reference to FIG. 7A, which is a mode diagram illustrative of the operation of the selective inhibition means in this embodiment, and also to FIG. 7B which is a timing chart further illustrating the operation.

Ordinary Reading Mode

The operation in the ordinary reading mode will be explained first. Referring to FIG. 7A, both the zooming control signals ZM2 and ZM3 are set high (H). The signal $Z_c$ is always set high. In consequence, all the transistors $Q_{za2}$ and $Q_{zc2}$ and the transistors $Q_{za3}$ to $Q_{zc3}$ are turned on. Then, as shown in the upper part of FIG. 7B, the start pulse $\phi s_1$ is input in response to the completion of the horizontal blanking period, and the scanning pulses are output from the shift register 107 at the ordinary frequency $f_s$, whereby ordinary reading is executed.

Since the signals from the optical black portion ob are read at the end of the reading period in this embodiment, the clamping is conducted by inputting the clamp pulse CP to the processing circuit 106' in the initial end portion $t_{ob1}$ of the horizontal blanking period.

Doubling Zoom-out Mode

Figure 7A:
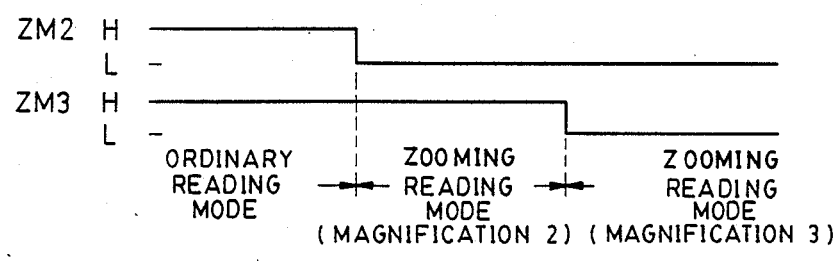
FIG. 7A is a mode diagram showing the operation of a selective inhibiting means incorporated in the embodiment shown in FIG. 6.

Control signals ZM2 and ZM3 are set low (L) and high (H), respectively, as shown in FIG. 7A, so that the transistors $Q_{za2}$ and $Q_{zc2}$ are turned off to inhibit reading of signals corresponding to the unnecessary portions a and c. On the other hand, transistors $Q_{za3}$, $Q_{zc3}$ and $Q_{tb}$ are on so that they enable signals to be read from the pixels corresponding to the portions $a_3$, $c_3$ and $b_3$ to be zoomed out.

Figure 5:
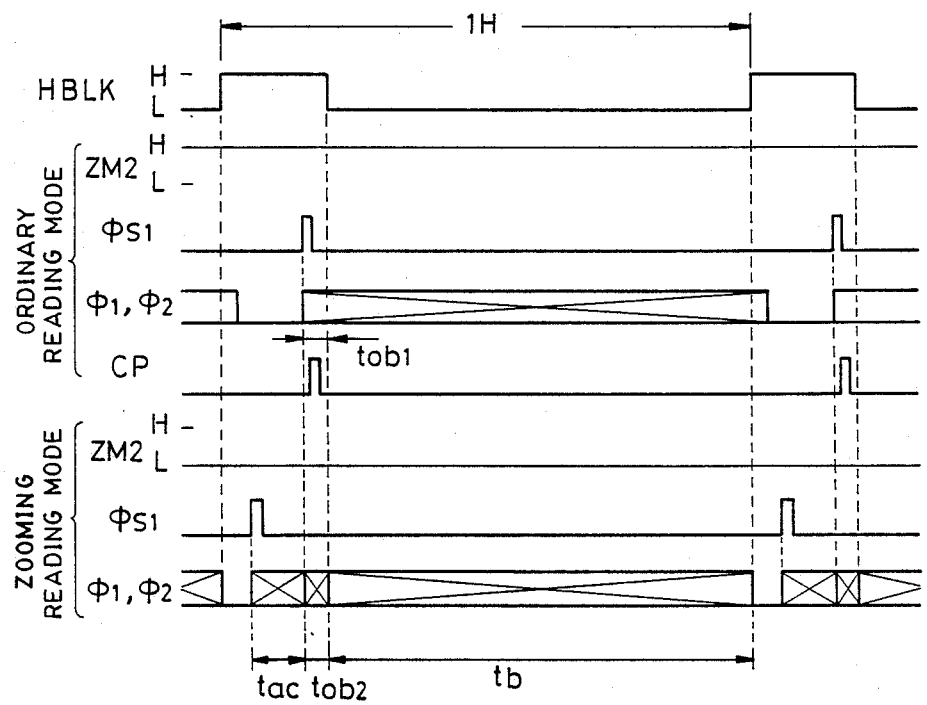
FIG. 5 is a timing chart illustrating an example of operation of the embodiment shown in FIG. 4.
Figure 7B:
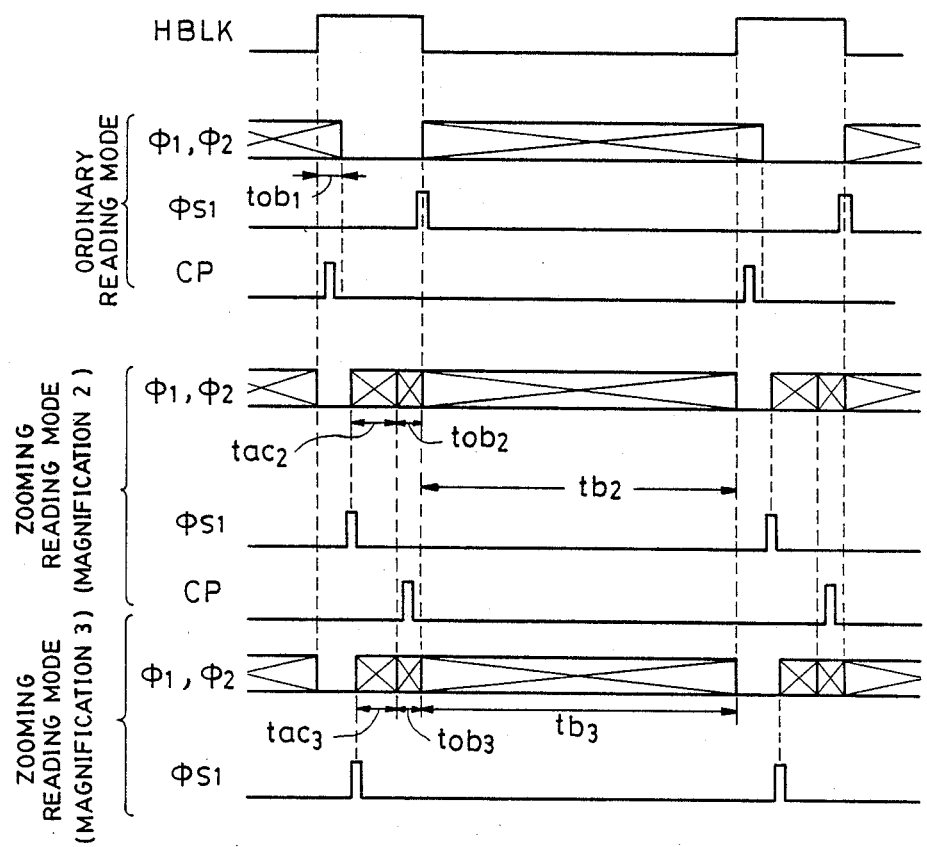
FIG. 7B is a timing chart illustrating an example of operation of the embodiment shown in FIG. 6.

The operation in the doubling zoom-out mode, illustrated in the middle part of FIG. 7B, is substantially the same as that in the second embodiment shown in the lower part of FIG. 5. Namely, a part of the unnecessary portion a and the whole of the unnecessary portion c are simultaneously eliminated with a high pulse frequency of $2f_s$ in a period $t_{ac2}$. In the subsequent period $t_{ob2}$, the signals from the optical black portion ob are read at the ordinary frequency $f_s$. At the same time, the remaining part of the unnecessary portion a is eliminated. Since the transistors $Q_a$ have been turned off, only the signals from the optical black portion ob are sent to the output line 104. Simultaneously, the clamp pulse CP is input to the processing circuit 106'. Subsequently, the signals from the pixels corresponding to the portion $b_2$ to be zoomed out are read at a reduced frequency $f_s/2$ in the period which corresponds to the effective period.

In consequence, the portion $B_2$ is zoomed out and read at a magnification of 2.

Tripling Zoom-out Mode

In this operation mode, both the zooming control signals ZM2 and ZM3 are set low (L) as shown in FIG. 7A, while all the transistors $Q_{za2}$, $Q_{zc2}$, $Q_{za3}$ and $Q_{zc3}$ are turned off, whereby reading is inhibited from all the pixels other than the pixels corresponding to the portion $b_3$ to be zoomed out and the optical black portion ob.

The operation in the tripling zoom-out mode, as shown in the lower part of FIG. 7B, is materially the same as that in the doubling zoom-out mode. Namely, parts of the unnecessary portions a and $a_3$, and the whole of the unnecessary portions $c_3$ and c are simultaneously eliminated with a frequency $3f_s$ in the period $t_{ac3}$, whereas, in the subsequent period $t_{ob3}$, signals corresponding to the optical black portion ob are read with ordinary frequency, simultaneously with the elimination of the remaining part of the unnecessary portion $a_3$. Since the transistors $Q_{a3}$ have been turned off, only the signals corresponding to the optical black portion ob are sent to the output line 104. Simultaneously, the clamp pulse CP is input to the processing circuit 106'. Subsequently, in a period $t_{b3}$ corresponding to the effective period, the signals from the portion $b_3$ to be read are conducted with a frequency $f_s/3$.

In consequence, the portion $B_3$ of the image is zoomed out and read with a magnification of 3.

Figure 8:
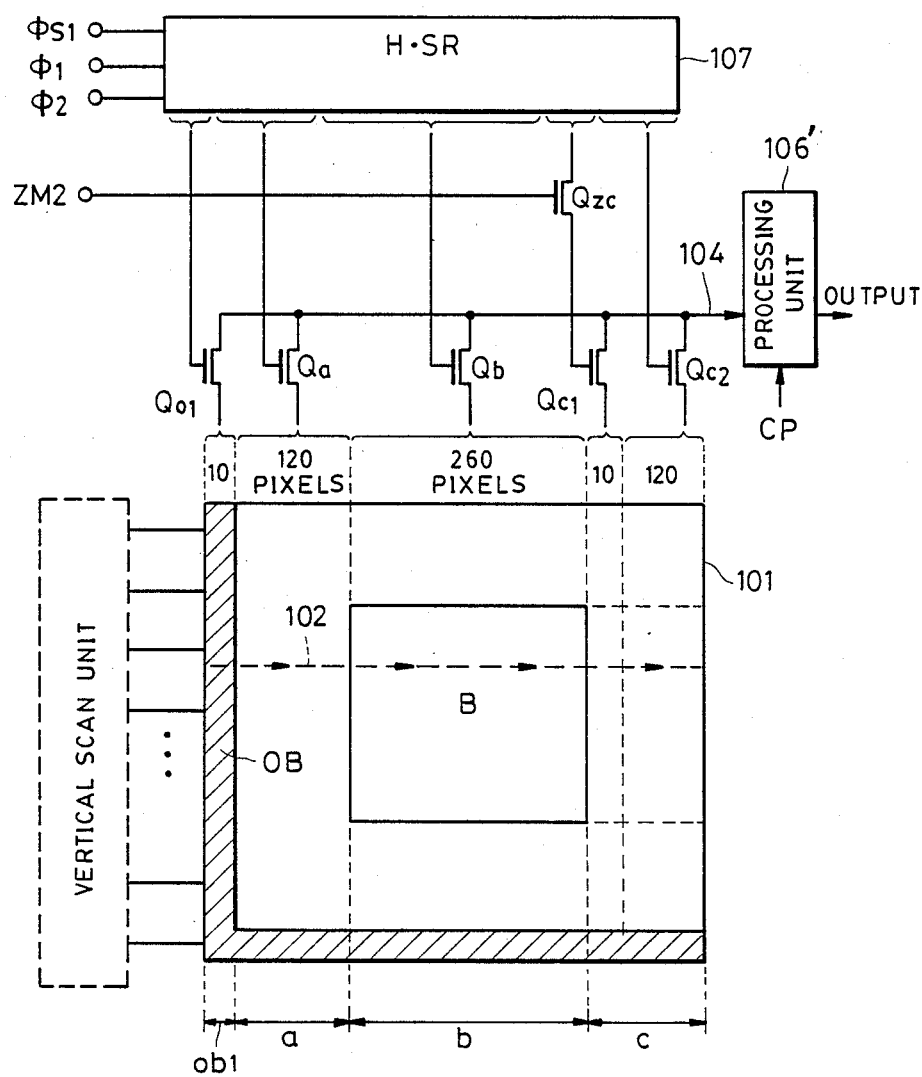
FIG. 8A is a schematic illustration of a fourth embodiment of an imaging apparatus in accordance with the present invention.
FIG. 8B is a timing chart illustrating the operation of the embodiment shown in FIG. 8A in a zoom-out reading mode.
Figure 8:
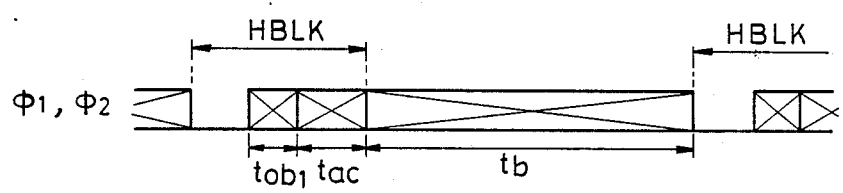

FIG. 8A is a schematic illustration of the construction of a fourth embodiment of the present invention, while FIG. 8B is a partial timing chart illustrating the operation of this embodiment in the zoom-out mode.

In this embodiment, the reading in zoom-out mode is effected by setting the control signal $ZM_2$ low, while turning off the transistor $Q_{zc}$ as the inhibition means.

In this state, the shift register is driven by the pulses $\phi_1$ and $\phi_2$ at a frequency $f_s$ within the horizontal blanking period, thereby reading signals from 10 pixels of the optical black portion $Ob_1$ in the period $t_{ob1}$. Since the transistors $Q_{zc}$ have been turned off for the 10 pixels from the beginning of the unnecessary portion c, the signals from these 10 pixels are not sent to the output line 104. In consequence, only the signals from the optical black portion $ob_1$ are input to the processing circuit 106' thereby enabling the setting of the black reference level in accordance with the clamp pulse CP.

In the subsequent period $t_{ac}$, the unnecessary portion a and the remaining part of the unnecessary portion c are eliminated at high speed with pulses of a frequency $2f_s$. When the horizontal blanking period is over, the signals corresponding to the portion b to be zoomed out are shifted by pulses of a frequency $f_s/2$ in a period $t_b$ which coincides with the effective period.

In order to avoid superposition of the signals from the unnecessary portion on the signals read from the optical black portion $o_{b1}$, the transistors $Q_{zc}$ are used as the selective inhibition means.

The second to fourth embodiments, as is the case of the first embodiment, are only illustrative and may be modified in various manners. For instance, these embodiments may be modified such that the vertical scanning unit includes an interlace circuit or such that a color decomposing mosaic filter is provided on the imaging device so that color signals are derived from a plurality of output lines.

Thus, in the second to fourth embodiments as described, scanning means are used which are capable of performing partially simultaneous scanning so that, when reading is conducted in the zoom-out reading mode, it is possible to simultaneously eliminate signals corresponding to unnecessary portions of an image, whereby the unnecessary portion of the image is eliminated at a high speed, without relying upon high-speed driving of the scanning means.

In addition, the selective inhibition means capable of partially inhibiting the simultaneous scanning enables such an operation such that only the OB signal is read at the desired speed, thereby facilitating clamping to ensure a highly accurate setting of the black reference level.

This in turn enables the desired portion of the image to be zoomed out without being accompanied by any degradation of the image, thus providing a sufficient margin in the blanking period. Such a margin can be utilized for various purposes other than the shifting of the signals.

Figure 9:
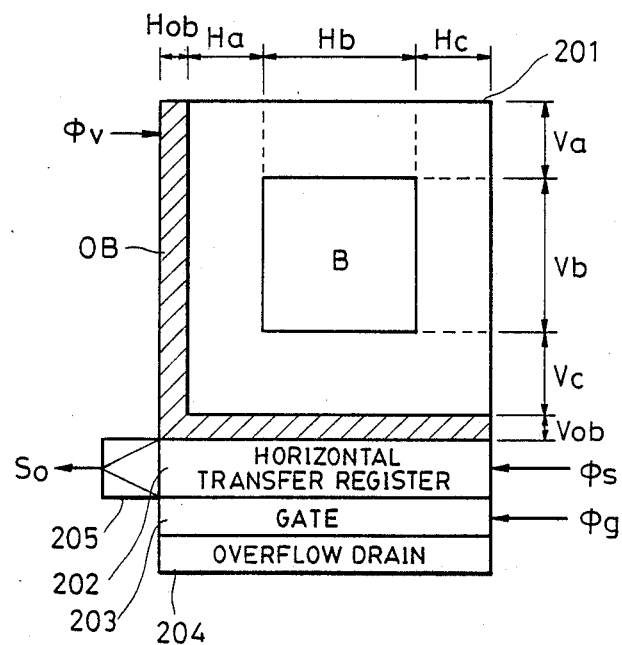
FIG. 9 is a schematic illustration of an imaging unit in a fifth embodiment of an imaging apparatus in accordance with the present invention.

FIG. 9 schematically shows a fifth embodiment of the imaging apparatus of the present invention.

This embodiment employs a CCD imaging device 201 which is capable of performing vertical shifting operation in accordance with vertical shifting pulses $\phi_v$. An optical black portion OB is formed on one end of the imaging device 201. The imaging device 201 has a multiplicity of pixels arranged in lines and columns, and a plurality of vertical shifting registers capable of picking-up signals from these pixels and shifting the signals vertically.

The vertically shifted charges are input to a horizontal transfer register 202 of the CCD in a line-by-line fashion. The horizontal shift register 202 shifts the charges in accordance with horizontal shifting pulses $\phi_s$, whereby a signal $S_o$ is output from the output amplifier 205.

In this embodiment, an overflow drain 204 is attached to the horizontal shift register 202 through a gate 203 which is adapted to be opened and closed by a pulse $\phi_g$. By opening the gate 203, it is possible to drain the shifted charges on the register 202 into the overflow drain 204.

Figure 10:
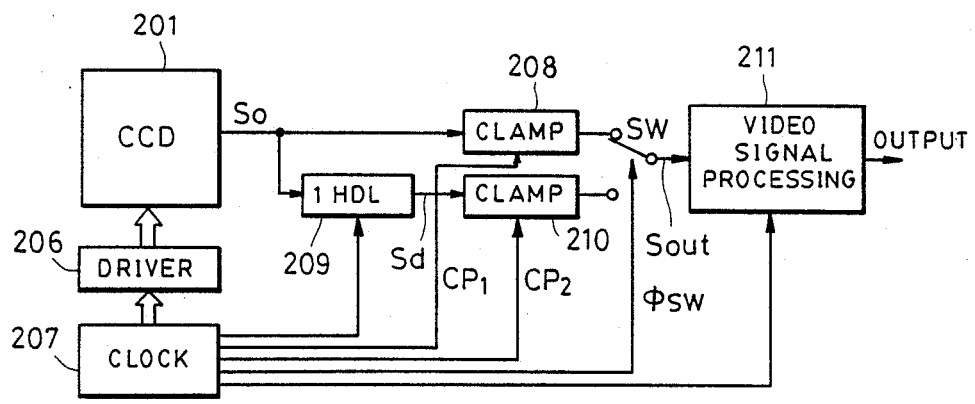
FIG. 10 is a schematic illustration of a signal processing unit incorporated in the embodiment shown in FIG. 9.

FIG. 10 schematically shows the construction of the signal processing unit incorporated in this embodiment. The pulses $\phi_v, \phi_s$ and $\phi_g$ for driving the imaging device 201 are supplied from a driver 206 which operates in accordance with clock pulses from a clock circuit 207.

The signal $S_o$ from the imaging device 201 is input to a clamp circuit 208 and a 1H (i.e., one horizontal scan period) delay circuit 209. The clamp circuit 208 is adapted to operate in synchronization with a clamp pulse $CP_1$ from the clock circuit 207, so as to clamp a signal corresponding to the optical black portion $H_{ob}$.

The 1H delay circuit 209 is adapted for storing the one-line signal $S_o$ which are input successively. The delay circuit 209 also delays the signals $S_o$ by a time corresponding to one horizontal scan so as to form a 1H delayed signal $S_d$ which is output to the clamp circuit 210.

The clamp circuit 210 operates in synchronization with the clamp pulse $CP_2$ from the clock circuit 207 so as to clamp a signal corresponding to the optical black portion of the delayed signal $S_d$.

A line switch SW is capable of selecting one of the output from the clamp circuit 208 and the output from the clamp circuit 210. The output $S_{out}$ from the line switch SW is input to a video signal processing circuit 211. The line switch SW operates in accordance with the control signals $\phi_{sw}$ from the clock circuit 207.

Figure 11:
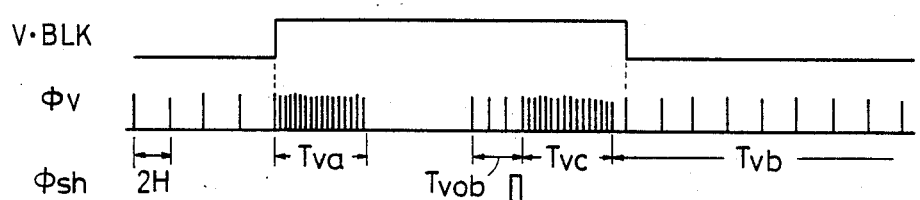
FIGS. 11A and 11B are timing charts illustrating an example of the operation of the embodiment shown in FIG. 9 in a zoom-out reading mode.
Figure 11:
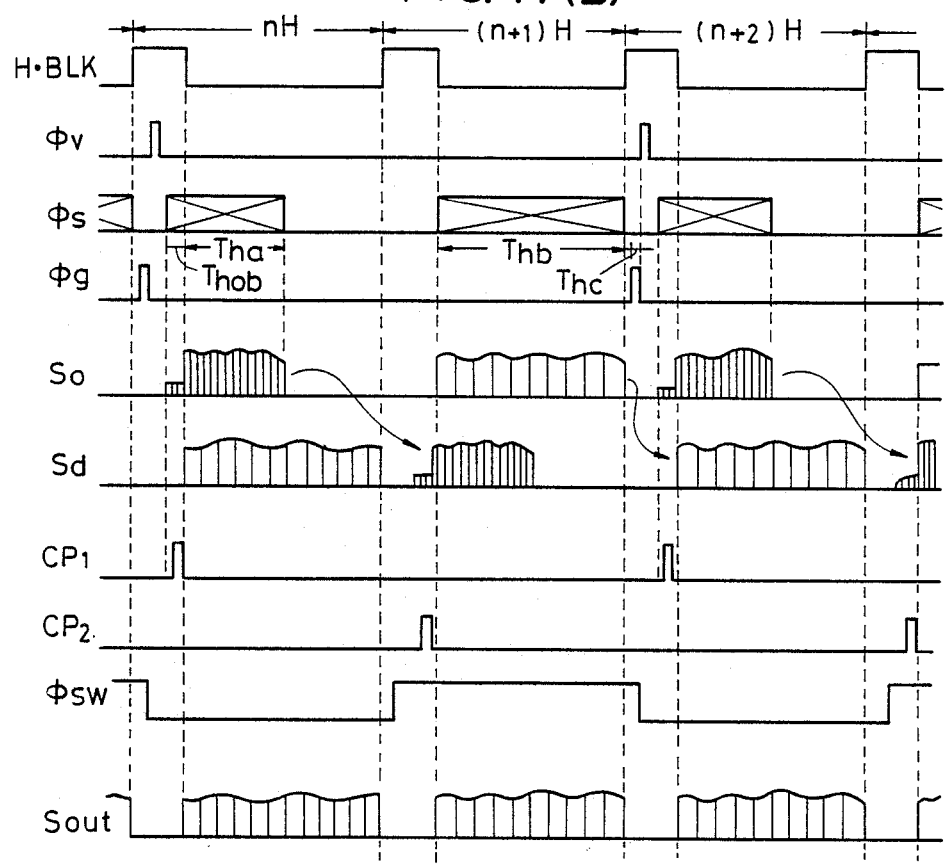

A description will be made hereinunder as to the operation of this embodiment, with specific reference to Figs. 11A and 11B which are timing charts illustrating the operation of this embodiment in the zoom-out reading mode. In this case, it is assumed that the zoom-out operation is conducted with a magnification of 2.

In order to read a portion B of the image in a size which is twice as large as that of the original image, it is necessary that the unnecessary portions $V_a$ and $V_c$ as viewed in the vertical directions are eliminated in a vertical blanking period, while the unnecessary portions $H_a$ and $H_c$ as viewed in the horizontal direction are eliminated within a horizontal blanking period.

In a vertical blanking period VBLK, the signals corresponding to the optical black portion $V_{ob}$ and the unnecessary portion $V_c$ are shifted in accordance with vertical shifting pulses $\phi v$ in periods $T_{vob}$ and $T_{vc}$, respectively. The signals corresponding to the optical black portion $V_{ob}$ are held in a suitable sample hold means in accordance with a sample hold pulse $\phi$sh, so as to be used for the purpose of correction of the dark current level. As will be seen from FIG. 11A, the vertical shift in the period $T_{vob}$ is conducted at a slow speed with a frequency fH, whereas, in the period $T_{vc}$, the vertical shift is conducted at a high speed.

When the vertical blanking period is over, the imaging device 201 is driven by pulses of a frequency which is half that of the ordinary frequency, i.e., at a period 2H, so that the signals from the portion to be zoomed out may be read in the effective vertical period.

Each vertical transfer pulse $\phi_v$ causes the signals of one line, e.g., n-th scanning line nH, in the portion $V_b$ to be zoomed out to be shifted to the horizontal shift register 202. The charges in the horizontal shift register 202 are then horizontally shifted in accordance with the horizontal shift pulses $\phi$s and are output through an amplifier 205.

Several pixels on the leading end of this output signal $S_o$ carry signals corresponding to the optical black portion $H_{ob}$. The level of these signals is clamped by the clamp circuit 208 in accordance with a clamp pulse $CP_1$ from the clock circuit 207, in a period $T_{hob}$.

Subsequently, signals corresponding to the unnecessary portion Ha are horizontally shifted in a period $T_{ha}$ within the effective period of the horizontal scan along the line nH, whereby these signals are ignored. To explain in more detail, in the effective period of the horizontal scan along the line nH, the line switch SW has been turned in accordance with the control signal $\phi$sw so as to select the clamp circuit 210, i.e., the delayed signal $S_d$ so that the effective signal portion $H_b$ of the preceding line, i.e., the line (n-1)H is read, as will be explained later in more detail.

The provision of the delay circuit 209, i.e., a buffer memory, enables the signals corresponding to the unnecessary portion $H_a$ to be eliminated in the effective period of the scanning along the line nH. This eliminates the necessity for high-speed shifting within the horizontal blanking. The elimination of the necessity for the high-speed shifting provides a sufficient margin for the clamping in the period $T_{hob}$, thus eliminating any clamping failure.

The signals corresponding to the unnecessary portion $H_a$ are input also to the 1H delay circuit 209.

In the horizontal blanking period annexed to the scanning along the (n+1)H line, the control signal $\phi$sw is inverted so that the line switch SW is turned to select the signal $S_o$. In consequence, the delayed signal $S_d$ corresponding to the unnecessary portion $H_a$, output from the delay circuit 209 after elapse of a time 1H, is ignored. It is to be noted, however, that the signals corresponding to the optical black portion $H_{ob}$ are clamped by the clamp circuit 210 in synchronization with the clamp pulse CP2. Horizontal shift pulses $\phi$s of a frequency $f_s/2$ are input to the register 202 in the effective period of the horizontal scanning along the line (n+1)H. In a period $T_{hb}$ within the effective period, the signals $S_o$ corresponding to the portion $H_b$ to be zoomed out are shifted. The signals $S_o$ are then delivered to the clamp circuit 208 in which the black level of these signals is fixed, and the signals $S_o$ with their black level fixed are selected by the switch SW, the output $S_{out}$ of which is delivered to the video processing circuit 211.

Simultaneously, the signals $S_o$ corresponding to the portion Hb to be zoomed out are delivered to the 1H delay circuit 209.

Then, the effective period of the scan along the (n+1)H line is over, and the horizontal blanking for the next line, i.e., line (n+2)H, is commenced. In this state, the gate pulse $\phi$g is input to the gate 203 so as to open this gate. In consequence, all the charges on the horizontal shift register 202 are eliminated, whereby the register 202 is cleared in a period $T_{hc}$. That is, the signals corresponding to the unnecessary portion $H_c$ remaining on the register 202 are eliminated in the period $T_{hc}$. Thus, the high-frequency shifting necessary for the elimination of the unnecessary portion $H_c$ can be dispensed with.

Subsequently, the control signal $\phi$sw is inverted so that the line switch SW is switched to select the delayed signal $S_d$. On the other hand, vertical shifting is conducted in the imaging device 201 in accordance with the vertical shifting pulse $\phi$v, whereby the next one-line signal is sent to the horizontal shift register 202.

Then, as in the case of the scanning along the line nH, the clamping of the level of signals corresponding to optical black portion $H_{ob}$ is conducted and, thereafter, the signals $S_o$ of the unnecessary portion $H_a$ are ignored by the supply of the horizontal shifting pulse $H_a$.

At the same time, in the effective period of the scanning along the line (n+2), the signals corresponding to the portion $H_b$ to be zoomed out, which were stored during the scanning along the preceding line, are output as the delayed signals $S_d$ since 1H, i.e., the period of one horizontal scan, has now elapsed. These signals are sent to the clamp circuit 210 so that the black level thereof is fixed, and the signals with the thus fixed black level are output through the line switch SW as the signals $S_{out}$. Thus, the signals corresponding to the portion $H_b$ to be zoomed out, which were shifted during scanning along the line (n+1), are passed through the delay circuit 209 and are read and output during scanning along the next successive line (n+2). The line switch SW is so controlled that it selects only the signals corresponding to the portion $H_b$ to be zoomed out, each time the scanning line is scanned.

The signals corresponding to the portion $H_b$ to be zoomed out are produced in the described manner for each of the successive scanning lines, whereby the signals corresponding to the portion $V_b$ to be zoomed out are read. The next vertical blanking period starts when the abovedescribed reading operation is completed. Simultaneously with the start of this vertical blanking period, the shifting of the signals corresponding to the unnecessary portion $V_a$ is conducted at high speed in accordance with the vertical shifting pulse $\phi$v in the period $T_{va}$.

The reading operation for one frame of image display is thus carried out.

Although the zooming ratio is 2 in the described embodiment, it will be readily understood by those skilled in the art that the principle of this embodiment can be applied to zooming out of a specific portion of an image with any desired magnification m. To this end, (m−1) delaying circuit portions 1H are connected in series such that the outputs from the respective delaying circuit portions are selected by the line switch.

As will be understood from the foregoing description, the fifth embodiment of the imaging apparatus of the invention features a scanning means which is capable of outputting a low-speed shift signal for shifting signals corresponding to a specific portion of an image for every predetermined number of horizontal scans; and the apparatus is capable of processing the signals corresponding to other portions of the image in the periods of horizontal scan along the scan lines other than the scan line for which the low-speed shifting signal is output.

According to this arrangement, it is possible to read a specific portion of an original image in the zoom-out reading mode, while enabling the signals corresponding to the unnecessary portions of the image to be processed in the periods of the horizontal scan along the scan lines other than the line for which the low-speed shift signal is output. This eliminates the necessity for any high-speed shift of signals, so that the image can be read by making use of a CCD imaging device, without being accompanied by any substantial reduction in the charge shifting efficiency, i.e., without suffering from any degradation of the resolution. Furthermore, the optical black level can stably be clamped. In addition, interpolation of data between adjacent horizontal scan lines can be effected during operation in the zoom-out mode.

Figure 12:
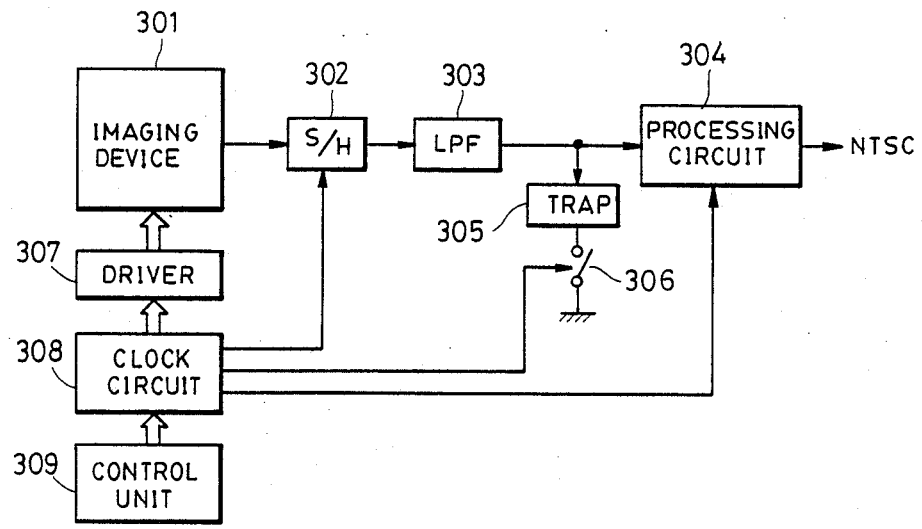
FIG. 12 is a schematic illustration of a sixth embodiment of an imaging apparatus in accordance with the present invention.

FIG. 12 schematically shows a sixth embodiment of the imaging apparatus of the present invention. This embodiment eliminates any possibility of degradation of the image quality due to inclusion of vertical stripes in the image read and displayed in the zoom-out reading mode.

The zoom-out reading operation in the first to fifth embodiment employs low-speed shift of a predetermined portion of one-line signal. Namely, the shifting of signals is conducted by shifting clock pulses of a frequency which is $f_s/2$, when a specific portion of an image is to be zoomed out with magnification of 2. In consequence, clock noises are inevitably included in the image signal so as to produce vertical stripes which may degrade the quality of the display image. This problem, however, is overcome by the sixth embodiment, as will be understood from the following description.

Figure 13:
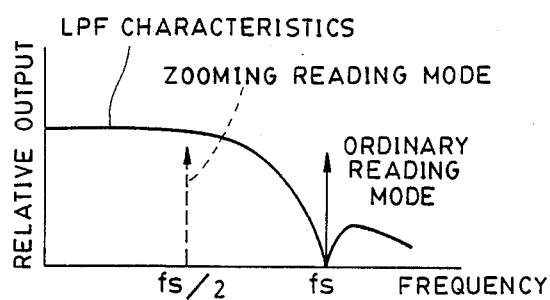
FIG. 13 is a graph showing the frequency characteristics of a low-pass filter (LPF) used in the embodiment of FIG. 12.

Referring to FIG. 12, the image signals successively read from the imaging device 301 are delivered to a sample and hold circuit 302 which conducts suppression of the unnecessary noises in the blanking period and clock leakage components, as well as wave-shaping of the image signals. The output from the sample and hold circuit 302 is delivered to a low-pass filter(LPF) 303 which has characteristics as shown in FIG. 13, whereby the clock leakage components derived from the ordinary shift frequency $f_s$ and other noise components are interrupted. The output from the LPF 303 is delivered to a processing circuit 304 which outputs a standard television signal such as of NTSC.

A frequency selective shunt or trap 305 is connected to the output terminal of the LPF 303. A mode change-over switch 306 is connected to the trap 305.

The imaging device 301 is driven by a driver 307 which operates in accordance with timing clock pulses from a clock circuit 308. The clock circuit 308 also produces clock pulses for controlling the operations of the sample and hold circuit 302, the processing circuit 304 and the mode changeover switch 306. The clock circuit 308 itself is controlled by a control unit 309.

In the reading operation in the ordinary reading mode, the control unit 309 controls the clock circuit 308 such that the imaging device 301 is driven at an ordinary shifting frequency $f_s$, whereas, in the zoom-out reading mode, e.g., in a doubling zooming mode, the signals corresponding to the portion to be zoomed out are shifted at a reduced shifting frequency, e.g., $f_s/2$.

Figure 14:
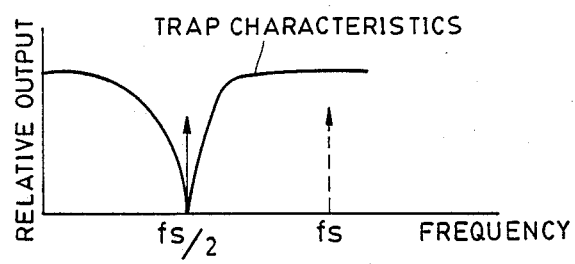
FIG. 14 is a graph showing the frequency characteristics of a trap in a doubled-size reading mode of operation in the embodiment of FIG. 12.

FIG. 14 shows the frequency characteristics of the trap 305 as obtained when the reading is conducted in doubling zooming mode. Since the magnification is 2, the clock leakage component has a frequency of $f_s/2$ so that the trap 305 has to remove the component of the frequency $f_s/2$.

More specifically, in the zoom-out reading mode of operation, the mode change-over switch 306 is turned on or closed in accordance with a clock from the clock circuit 308 under the control of the control unit 309. As a result, the trap 305 becomes operative and the leakage component of the frequency $f_s/2$ which passes through the LPF 303 is shunted or removed by the trap 305, whereby the processing circuit 304 can receive an image signal having no clock leakage component superposed thereon. In consequence, no vertical stripe appears on the display image formed by the NTSC signal output from the processing circuit 304.

Figure 15:
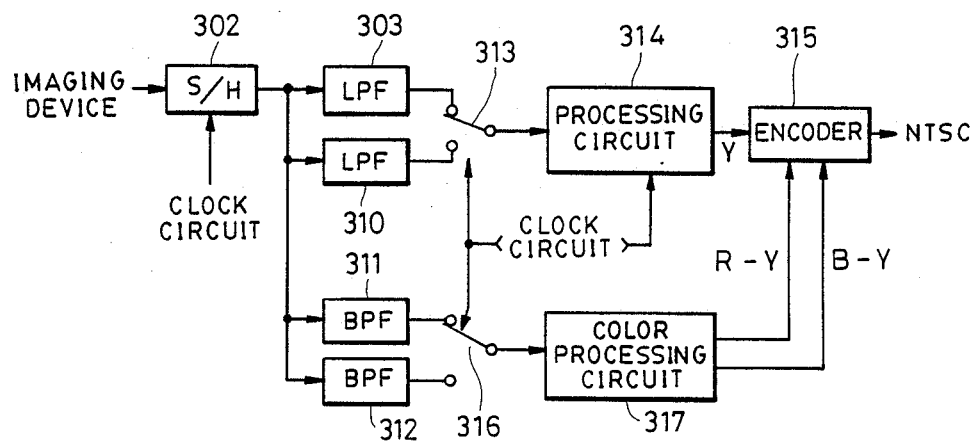
FIG. 15 is a schematic illustration of a seventh embodiment of an imaging apparatus in accordance with the present invention.
Figure 16:
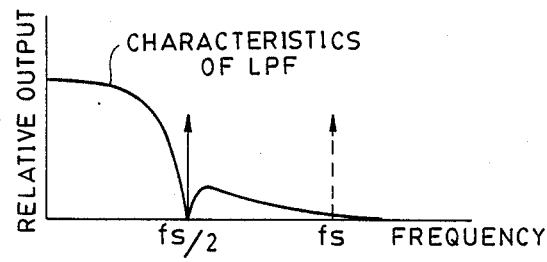
FIG. 16 is a graph showing the characteristics of an LPF used in the embodiment shown in FIG. 15.

FIG. 15 is a schematic illustration of a seventh embodiment of the present invention, while FIG. 16 is a graph showing the frequency characteristics of an LPF used in this embodiment.

In this embodiment, the image signal from the sample and hold circuit 302 is received by an LPF 303, another LPF 310, a band-pass filter (BPF) 311 and another BPF 312. The LPF 303 has characteristics as shown in FIG. 13, while the LPF 310 has characteristics as shown in FIG. 16. It will be seen that the LPF 310 is a filter which has characteristics for cutting off the signals of frequency higher than the zoom-out reading shifting frequency $f_s/2$. Thus, the signal which has passed the LPF 303 is the luminance signal (Y signal) in the ordinary reading mode, while the signal which has passed the LPF 310 is the Y signal in the zoom-out reading mode.

The signal which is passed through the BPF 311 is, for example, a color signal obtained in the ordinary reading mode, while the signal which is passed through the BPF 312 is, for example, a color signal obtained in the zoom-out reading mode. The band width of the BPF 311 is narrower than that of the BPF 312, and the central frequency of the BPF 311 is higher than that of the BPF 312.

The switch 313 is adapted to select the Y signal from the LPF 303 in the ordinary reading mode and to select the Y signal from the LPF 310 in the zoom-out reading mode. The clock leakage component in the zoom-out reading mode, therefore, is cut-off by the LPF 310. The Y signal selected by the switch 313 is input to the encoder 315 through the processing circuit 314.

The switch 316 selects the color signals from the BPF 311 and the color signals from the BPF 312, respectively, in the ordinary reading mode and in the zoom-out reading mode. The selected color signals are processed by a color processing circuit 317 which computes (R-Y) signal and (B-Y) signal. The thus computed (R-Y) signal and (B-Y) signal are input to an encoder 315.

The above-described operation of the switches 313 and 316 is conducted in accordance with clock pulses from the clock circuit 308.

The encoder 315 receives the Y signal, the (R-Y) signal and the (B-Y) signal containing no clock leakage component even in the zoom-out reading mode, and produces standard television signals such as NTSC signals.

As will be understood from the foregoing description, the sixth and seventh embodiments feature a filter which is capable of changing the cut-off frequency in accordance with the shifting frequency, so that it is possible to cut-off any noise component such as the leakage component of the shifting frequency in, for example, the zoom-out reading mode, thereby ensuring a high quality of the zoomed display image having no vertical stripe.

It will also be appreciated from the foregoing that the various elements shown in block or outline form in the drawings are conventional, well-known elements and their particular internal construction or configuration and operating parameters are not critical to this invention. Therefore, in the interest of clarity, they are not described in further detail.

What is claimed is:

1. An image apparatus comprising:
   (a) imaging means capable of converting an optical image into an electric image signal;
   (b) change-over means capable of conducting a changeover between a first mode in which a predetermined portion of said electric image signal is produced by said imaging means at a first speed and a second mode in which said predetermined portion of said electric image signal is read at a second speed lower than said first speed;
   (c) processing means for processing the signal read from said imaging means so as to form a video signal, said processing means further comprising a clamping means arranged to set a reference black level of the electric image signal; and
   (d) control means for changing the processing characteristics of said processing means is accordance with the change-over between said first mode and said second mode.

2. An imaging apparatus according to claim 1, wherein said control means is arranged to change time of occurrence of clamping performed by said clamping means.

3. An imaging apparatus according to claim 1, wherein said control means is arranged to change a time duration of the clamping performed by said clamping means.

4. An imaging apparatus according to claim 1, wherein said processing means includes a filter connected and arranged to eliminate noise components introduced in said second mode.

5. An imaging apparatus according to claim 4, wherein said control means is arranged to change the filtering characteristics of said filter.

6. An imaging apparatus according to claim 5, wherein said control means is arranged to control the filtering characteristics such that the upper limit of frequencies passed by said filter is lower when said second mode is selected than when said first mode is selected.

7. An imaging apparatus comprising reading means and processing means for sequentially reading photoelectrically converted image information, selectively in a first mode in which a desired portion of said image information is read at a frequency different from the frequency for reading other portions of said image information, followed by processing of said desired portion of said image information to form an effective image, and in a second mode in which said desired portion of said image information is read at the same frequency as the frequency for reading other portions of said image information, followed by processing of said desired portion of said image information to form an effective image, clamping means for setting a black reference signal for said processing means at a predetermined time within a blanking period and means for changing said predetermined time in accordance with a change-over between said first mode and said second mode.

8. An imaging apparatus according to claim 7, wherein the means for changing said predetermined time is also arranged to change the duration of said predetermined time in accordance with the change-over between said first mode and said second mode.

9. In an imaging apparatus having means for changing the frequency of shifting of an image signal, filtering means arranged to filter a shifted image signal and means for changing the band cut-off frequency of said filtering means in accordance with a change in the shifting frequency.

10. An imaging apparatus according to claim 9, wherein said filtering means includes a plurality of low-pass filters having different filtering characteristics.

11. An imaging apparatus according to claim 9, wherein said filtering means includes a selectively adjustable filter.

12. In an imaging apparatus, means for shifting a part of an image signal selectively at one of a low speed and a high speed, and processing means arranged to output a low-speed shifting signal for a predetermined portion of a one-line image signal, for every predetermined number of horizontal scans, and further arranged to process signals corresponding to the other portions of said one-line image signal in the periods of horizontal scan along horizontal lines other than the horizontal scan line for which said low-speed shifting signal is output.

13. An imaging apparatus according to claim 12, wherein said processing means includes a signal delay means arranged to delay said image signal by a period equal to one horizontal scan period.

14. In an imaging apparatus, means for sequentially transferring signals derived from an imaging device, comprising:
   scanning means arranged to simultaneously scan different portions of said imaging device other than a desired portion, said simultaneous scanning of the different portions being performed at a time different than the scanning of the desired portion; and
   selective inhibiting means arranged to selectively inhibit the simultaneous scanning performed by said scanning means.

15. An imaging apparatus comprising:
   (a) imaging means for converting an optical image into an electric image signal;
   (b) a shift register connected to read the electric image signal from said imaging means;
   (c) reading means connected to drive a predetermined portion of said shift register selectively at one of a first speed and at a second speed lower than said first speed; and
   (d) control means arranged to simultaneously drive portions of said shift register, other than said predetermined portion, when said second speed is selected.

16. An imaging apparatus according to claim 14, further including clamping means for clamping signals of portions where the simultaneous scanning is inhibited by said selective inhibiting means.

17. An imaging apparatus according to claim 15, wherein said control means is arranged to eliminate signals of the portions driven simultaneously.

18. An imaging apparatus comprising:
 (a) imaging means capable of converting an optical image into an electric image signal;
 (b) change-over means capable of conducting a change-over between a first mode in which a predetermined portion of said electric image signal is produced by said imaging means at a first speed and a second mode in which said predetermined portion of said electric image signal is read at a second speed lower than said first speed;
 (c) processing means, including a filter connected and arranged to eliminate noise components, for processing the signal read from said imaging means so as to form a video signal; and
 (d) control means for changing filtering characteristics of said filter and processing characteristics of said processing means in accordance with the change-over between said first mode and said second mode.

19. An imaging apparatus according to claim 18, wherein said processing means includes clamping means arranged to set a reference black level of the electric image signal.

20. An imaging apparatus according to claim 19, wherein said control means is arranged to change a time of occurrence of the clamping performed by said clamping means.

21. An imaging apparatus according to claim 19, wherein said control means is arranged to change a time duration of the clamping performed by said clamping means.

22. An imaging apparatus according to claim 18, wherein said control means is arranged to control the filtering characteristics such that the upper limit of frequencies passed by said filter is lower when said second mode is selected than when said first mode is selected.

* * * * *